United States Patent
Ali et al.

(10) Patent No.: US 8,913,668 B2
(45) Date of Patent: Dec. 16, 2014

(54) PERCEPTUAL MECHANISM FOR THE SELECTION OF RESIDUES IN VIDEO CODERS

(75) Inventors: Walid Ali, Sammamish, WA (US); Rony Ferzli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1428 days.

(21) Appl. No.: 12/240,554

(22) Filed: Sep. 29, 2008

(65) Prior Publication Data

US 2010/0080302 A1    Apr. 1, 2010

(51) Int. Cl.
| | |
|---|---|
| *H04L 29/06* | (2006.01) |
| *H04N 19/132* | (2014.01) |
| *H04N 19/182* | (2014.01) |
| *H04N 19/117* | (2014.01) |
| *H04N 19/14* | (2014.01) |
| *H04N 19/85* | (2014.01) |

(52) U.S. Cl.
CPC ... *H04N 19/00127* (2013.01); *H04N 19/00303* (2013.01); *H04N 19/00066* (2013.01); *H04N 19/00157* (2013.01); *H04N 19/00903* (2013.01)
USPC ........... 375/240.24; 375/E7.085; 375/E7.076; 375/240.12; 375/240.17

(58) Field of Classification Search
None
See application file for complete search history.

(56) References Cited

U.S. PATENT DOCUMENTS

| | | | | |
|---|---|---|---|---|
| 5,351,084 | A | 9/1994 | Blair | 348/390 |
| 5,627,938 | A | 5/1997 | Johnston | 704/200.1 |
| 5,764,805 | A | 6/1998 | Martucci | 382/238 |
| 5,883,979 | A | 3/1999 | Beretta | 382/251 |
| 6,456,663 | B1 * | 9/2002 | Kim | 375/240.25 |
| 6,662,367 | B2 | 12/2003 | Dapper et al. | |
| 6,744,927 | B1 | 6/2004 | Kato | |
| 6,748,019 | B1 | 6/2004 | Lin | 375/240.24 |
| 6,965,697 | B1 | 11/2005 | Kondo | 382/232 |
| 7,116,835 | B2 * | 10/2006 | Takahashi et al. | 382/251 |
| 7,212,668 | B1 * | 5/2007 | Luo et al. | 382/165 |
| 7,215,345 | B1 | 5/2007 | Hanko | |

(Continued)

FOREIGN PATENT DOCUMENTS

WO    WO200711282 A1    10/2007

OTHER PUBLICATIONS

Morin, Francois; Bilodeau, Guillaume-Alexandre. Fusion of Multispectral Video Sequences Based on the Trajectories of Moving Objects. Rose 2007. Pub. Date: 2007. Relevant pp. 1-5. http://ieeexplore.ieee.org/stamp/stamp.jsp?tp=&arnumber=4373979.*

(Continued)

*Primary Examiner* — Dede Zecher
*Assistant Examiner* — Jeremiah Avery
(74) *Attorney, Agent, or Firm* — Andrew Smith; Jim Ross; Micky Minhas

(57) ABSTRACT

A perceptual mechanism for residue selection in a video encoder may be provided. The mechanism may comprise a method, system, or device for receiving video frames comprising pluralities of pixels. For each video frame, a sensitivity threshold may be determined for each pixel of a previous video frame. The pixels of the video frame may compared in turn to the pixels of the previous video frame to determine a residue value. The residue value may be compared to the sensitivity threshold such that when the residue value is less than the sensitivity threshold, the pixel data in the video frame may be zeroed out prior to encoding the video frame for transmission.

20 Claims, 4 Drawing Sheets

(56) References Cited

U.S. PATENT DOCUMENTS

| | | | |
|---|---|---|---|
| 7,292,602 B1 | 11/2007 | Liu | 370/468 |
| 7,310,445 B2* | 12/2007 | Kupeev et al. | 382/173 |
| 7,321,672 B2* | 1/2008 | Sasaki et al. | 382/124 |
| 7,675,985 B1 | 3/2010 | Watson | |
| 7,864,859 B2* | 1/2011 | Shin et al. | 375/240.16 |
| 8,457,194 B2 | 6/2013 | Ali et al. | |
| 2003/0067979 A1* | 4/2003 | Takahashi et al. | 375/240.03 |
| 2003/0081854 A1 | 5/2003 | Deshpande | |
| 2003/0108250 A1 | 6/2003 | Luo et al. | |
| 2003/0135865 A1 | 7/2003 | Jung | |
| 2003/0142213 A1 | 7/2003 | Ali et al. | |
| 2005/0196072 A1 | 9/2005 | Zhong | 382/298 |
| 2005/0213658 A1 | 9/2005 | Vitali | 375/240.03 |
| 2006/0034512 A1 | 2/2006 | Sheraizin et al. | |
| 2006/0072664 A1* | 4/2006 | Kwon et al. | 375/240.16 |
| 2006/0222078 A1* | 10/2006 | Raveendran | 375/240.16 |
| 2006/0268990 A1 | 11/2006 | Lin | 375/240.24 |
| 2007/0064816 A1 | 3/2007 | Chiang | 375/240.29 |
| 2007/0074266 A1* | 3/2007 | Raveendran et al. | 725/135 |
| 2007/0091997 A1 | 4/2007 | Fogg | 375/240.1 |
| 2008/0018506 A1 | 1/2008 | Raveendran | 341/51 |
| 2008/0027732 A1 | 1/2008 | Baumgarte | 704/500 |
| 2008/0031538 A1 | 2/2008 | Jiang | 382/261 |
| 2008/0120676 A1 | 5/2008 | Morad | 725/127 |
| 2008/0211901 A1 | 9/2008 | Civanlar et al. | |
| 2009/0073006 A1 | 3/2009 | Wegener | |
| 2009/0207316 A1* | 8/2009 | Cupal et al. | 348/700 |
| 2010/0080283 A1 | 4/2010 | Ali et al. | |

OTHER PUBLICATIONS

Andrea Cavallaro et al., "Perceptual Semantics", 2006, *IDEA Group Publishing*, ITB12970, pp. 1-20, http://www.igi-pub.com/downloads/excerpts//ITB12970.pdf.

X.H. Zhang et al., "Improved estimation for just-noticeable visual distortion", Signal Processing 85 (2005), pp. 795-808, http://www3.ntu.edu.sg/home/WSLin/sdarticleXH.pdf.

"Video and Image Processing Suite User Guide", Suite Version 8.0, Jun. 2008, Altera Corporation, pp. 1-198, http://www.altera.com/literature/ug/ug_vip.pdf.

Gratis, Libros, "Codec 6.2.5 Released—With Sharpening Filter!", Feb. 12, 2007, DivX Labs, pp. 1-3, http://labs.divx.com/nodc/7.

Klompenhouwer, Michiel, et al., "Subpixel Image Scaling for Color Matrix Displays", 2003, Philips Research Laboratories, pp. 1 13, http://www.es.ele.tue.nl/~dehaan/pdf/90 jsid2003.pdf.

Glover, Mark V., *Internetworking: Distance Learning 'To Sea' Via Desktop Videoconferencing*, "Tools and IP Multicoat Protocols, Chapter III, Major Videoconferencing Standards", Mar. 1998, Distance Learning—U.S. Navy Seanet, pp. 1-13, http://web.nps.navy.mil/~seanet/Distlearn/chp3.htm.

Punchihewa, Amal, et al., "Artefacts in Image and Video Systems: Classification and Mitigation", Nov. 26-28, 2002, Massey University, pp. 1-6, http://sprg.massey.ac.nz/pdfs/2002_IVCNTZ_197.pdf.

U.S. Office Action mailed Aug. 25, 2011 in U.S. Appl. No. 12/240,009.

U.S. Appl. No. 12/240,009, filed Sep. 29, 2008, entitled "Processing Real-Time Video", Inventors: Walid Ali and Rony Ferzli.

U.S. Office Action in U.S. Appl. No. 12/240,009 dated Jul. 3, 2012, 9 pgs.

Notice of Allowance mailed Jan. 18, 2013 in U.S. Appl. No. 12/240,009, 12 pages.

U.S. Appl. No. 12/240,009, Amendment and Response filed Feb. 27, 2012, 15 pgs.

U.S. Appl. No. 12/240,009, Amendment and Response filed Oct. 3, 2012, 11 pgs.

U.S. Appl. No. 12/240,009, Notice of Allowance mailed Feb. 27, 2013, 4 pgs.

U.S. Appl. No. 12/240,009, Amendment and Response after Allowance filed Mar. 7, 2013, 10 pgs.

U.S. Appl. No. 12/240,009, USPTO Response after Allowance mailed Mar. 19, 2013, 2 pgs.

U.S. Appl. No. 12/240,009, Notice of Allowance mailed May 7, 2013, 2 pgs.

* cited by examiner

PERCEPTUAL MECHANISM FOR THE SELECTION OF RESIDUES IN VIDEO CODERS

RELATED APPLICATION

Related U.S. patent application Ser. No. 12/240,009, filed on even date herewith in the name of Walid Ali and Rony Ferzli, entitled "PROCESSING REAL-TIME VIDEO," and assigned to the assignee of the present application, is hereby incorporated by reference.

BACKGROUND

Video conferencing technology can be used to provide video conferencing and other interactive environments. For example, video conferencing systems can be used to enable interactions between two or more participants at remote locations. Signal processing techniques can be used to enhance the user experience while participating in a video conference. Bandwidth constraints can limit the amount of data that can be used when distributing a given bandwidth budget to multiple conferencing users. As an example, some techniques sacrifice quality to compensate for a system load when multiple users share a common communication channel.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide video conferencing functionality including using pre-processing features to provide an encoded video signal, but the embodiments are not so limited. In an embodiment, components of a video conferencing system can operate to provide a video signal based in part on the use of features of a pre-processing component operable to determine a contrast sensitivity threshold above which luminescence differences in associated pixels of subsequent video frames may result in visually detectable differences. In one embodiment, a video conference device can include a pre-processing component operable to zero out pixel data in a video frame when it determines that differences in the pixel's luminescence as compared to a previous video frame are below a contrast sensitivity threshold. Consistent with exemplary embodiments, pixels set to zero value may not need to be encoded for transmission to a video receiver and may result in less bandwidth consumed in a video conferencing environment.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
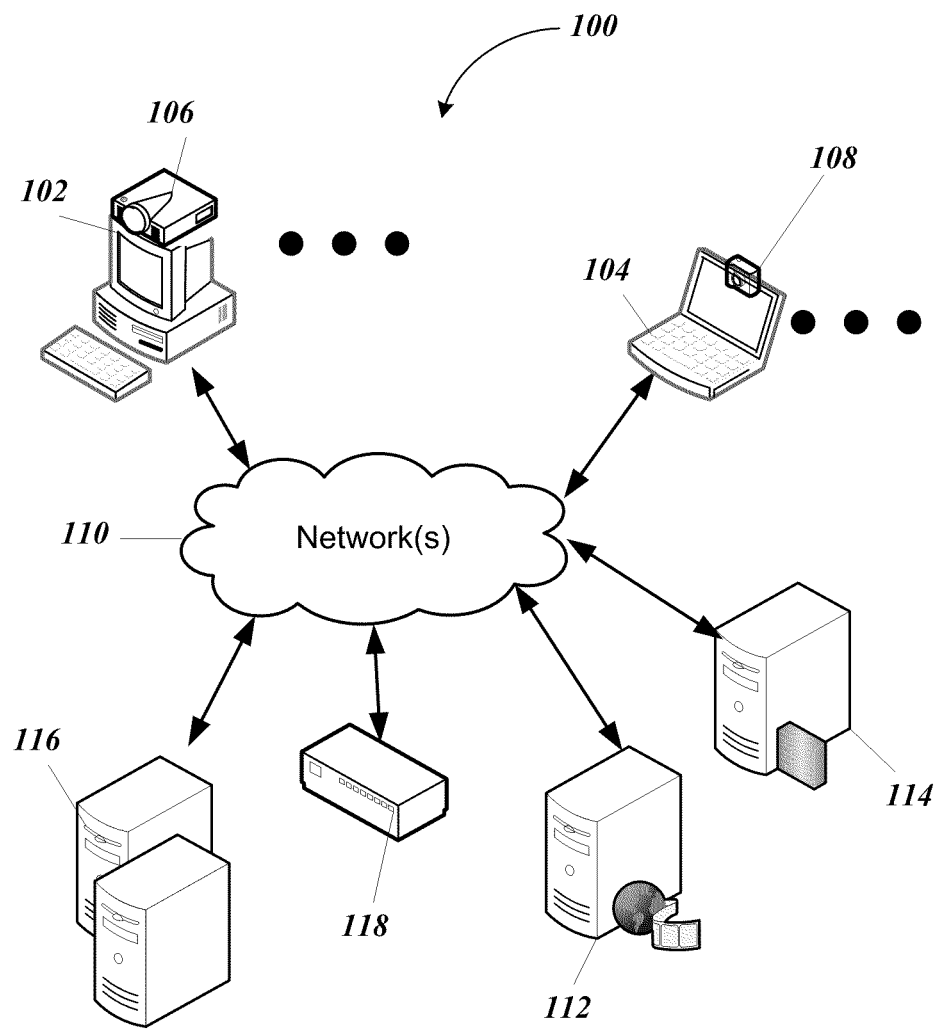
FIG. 1 is a block diagram illustrating an exemplary video conferencing system.

Various embodiments can be configured to provide a video conferencing environment to one or more communication participants, but are not so limited. For example, hardware, software, memory, processing, and/or other resources can be used to provide video conferencing functionality that can compensate for bandwidth constraints associated with a video conferencing environment, as described below. Signal processing features can be used to manage and control processing operations as part of providing a video conferencing environment to one or more conference participants.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A perceptual mechanism for the selection of residues in video coders may be provided. Consistent with exemplary embodiments, a video conferencing system may capture a sequence of video frames, wherein each frame comprises multiple pixels. Each pixel may provide data related to rendering a portion of the video frame. The video conferencing system may process each video frame to prepare the frame for encoding and transmission on a communication channel such as a data network. Processing the video frame may comprise determining a sensitivity threshold for each pixel in the frame in turn, wherein the sensitivity threshold comprises a level of contrast below which any variation is not visually perceptible to a human eye. Each pixel of the video frame may be compared to a corresponding pixel of a subsequent video frame to determine whether the contrast of the corresponding pixel falls below the determined sensitivity threshold. The comparison may determine a perceptual residue value for the corresponding pixel comprising a difference in a luminescence of the pixel for which the sensitivity threshold was determined and a luminescence of the pixel in the subsequent video frame. If the contrast does fall below the sensitivity threshold, the pixel data in the subsequent video frame may be zeroed out so that when the subsequent video frame is encoded for transmission, no data need be encoded for that pixel and less bandwidth may be consumed in the transmission of the encoded subsequent video frame.

FIG. 1 is a diagram depicting an exemplary video conferencing system 100. The video conferencing system includes a network (e.g., network 110) or networks enabling a number of participants with video transmission and reception capability to communicate with one another over the network 110. Each participant device 102, 104 can include any computing device with audio/video capability such as a desktop, laptop computer, or other computing/communication device having a camera, microphone, speaker, display and/or video conferencing equipment.

As shown in FIG. 1, device 102 includes a camera 106 and device 104 also includes a camera 108. Cameras 106, 108 and other capture devices/systems can be used to provide video and other signals that can be used as part of an interactive video environment. As described below, pre-processing and/or post-processing features can be used to process captured pixel data irrespective of the mechanism or method used to capture the pixel data. For example, a video camera can be used to capture actions of one or more video conference participants at a designated frame rate (e.g., 15 frames/sec, 30 frames/sec, etc.) as part of a red-green-blue (RGB), YUV, or some other pixel format. Cameras 106, 108 can be separate components or video capture functionality can be integrated with device 102 and/or device 104. For example, a video camera or other optical device can be wirelessly coupled or directly wired ((e.g., Universal Serial Bus (USB), Peripheral Component Interface (PCI), etc.) to an associated video conferencing device and used to capture participant interactions.

Correspondingly, the video conferencing system 100 can include computing/communication devices having video capture functionality and associated video processing features. Moreover, video conferencing system 100 can include a plurality of computing/communication devices and the associated video capture functionality. As described below, the system 100 can include pre-processing and/or post-processing functionality that can be used to process pixel data as part of providing a video signal for display on an associated display. A video conferencing device can operate more efficiently by using the pre-processing and/or post-processing functionality to compensate for bandwidth and other communication constraints associated with a video conferencing environment.

As described below, pre-processed and/or post-processed signals can be communicated to one or more components of a video processing pipeline for further processing and use in providing a video stream to one or more video conferencing participants. In one embodiment, a captured frame can be processed by a perceptual residue selector component to analyze a frame of pixel data and determine a sensitivity threshold for each pixel in the frame of pixel data. The perceptual residue selector may compare the analyzed frame of pixel data to a subsequently captured frame of pixel data. Any pixel in the subsequently captured frame whose contrast falls below the determined sensitivity threshold may have its value set to zero. Zeroing out the pixel data may reduce the number of pixels which may need further processing. The field of pixel data may be communicated to an encoder for further processing.

With continuing reference to FIG. 1, network 110 can include any communication network or combination of networks. A video conference can be facilitated by a single device/program or by a combination of devices and programs. For example, audio/video server 112, firewall server 114, and/or mediation servers 116 can be included and used for different aspects of a conference, such as storage and processing of audio and/or video files, security, and/or interconnection of various networks for seamless communication between conference participants. Any of these example tasks and others may be performed by software, hardware, and/or a combination of hardware and software. Additionally, functionality of one or more servers can be further combined to reduce the number of components.

With continuing reference to FIG. 1, and as further example, a Multipoint Control Unit (MCU) 118 can be used as a primary facilitator of a video conference in coordination with one or more of other components, devices, and/or systems. MCU 118 may use various protocols such as Internet Protocol (IP) and variations thereof for example, and be structured as software program(s), hardware, or some combination thereof. MCU 118 can be implemented as a stand-alone hardware device, or embedded into dedicated conferencing devices (e.g., audio/video server 112, mediation servers 116, etc.). Additionally, MCU 118 can be implemented as a decentralized multipoint, where each station in a multipoint call exchanges video and audio directly with the other stations with no central manager.

Figure 2:
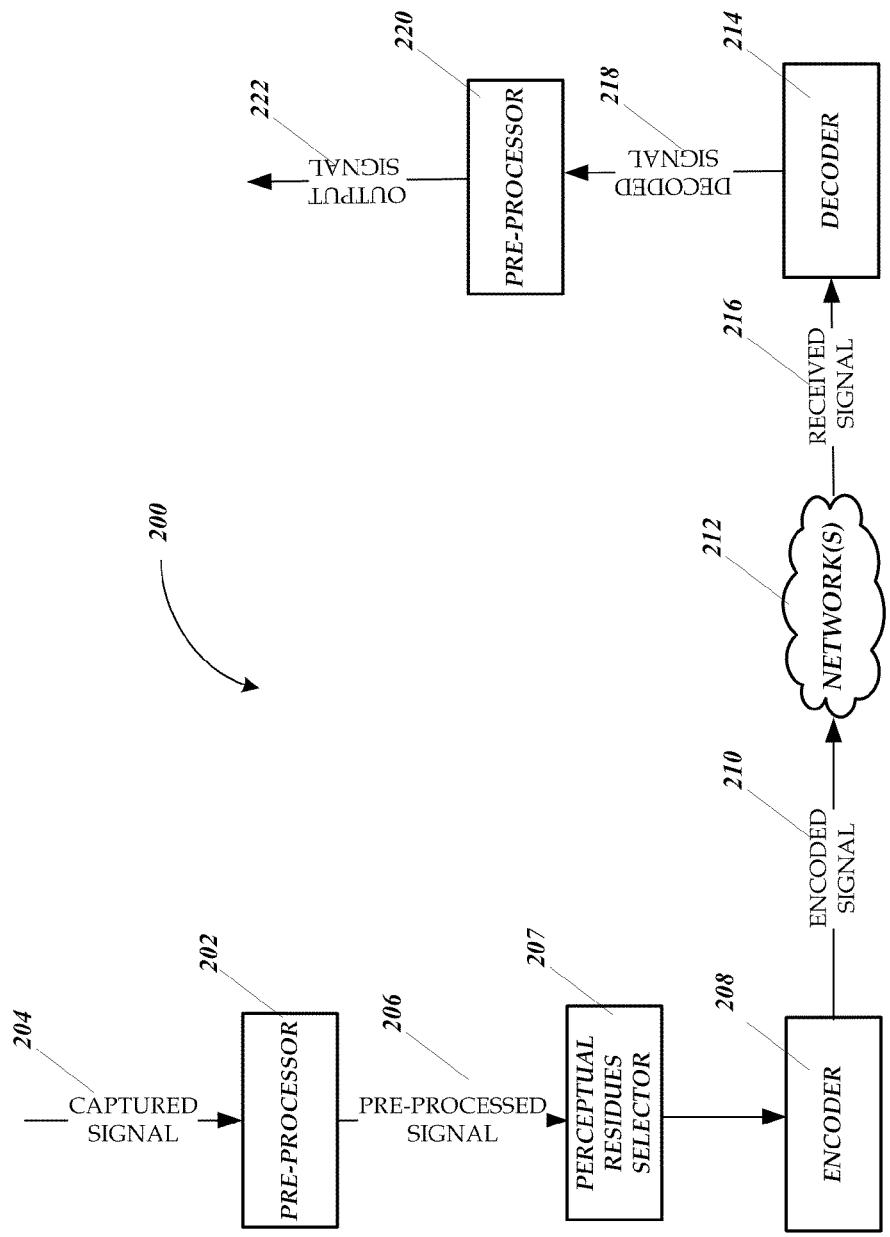
FIG. 2 is a flow diagram illustrating an exemplary process of processing a video signal.

FIG. 2 is a block diagram depicting an exemplary video conferencing system 200. According to an embodiment, and as shown in FIG. 2, the system 200 includes a pre-processor 202 that can be configured to process pixel data associated with a captured signal 204. For example, a stand-alone video camera can be used to capture a video scene associate with a video conferencing environment and output a captured signal which consists of frames of pixel data. That is, each frame includes a number of pixels having pixel values (color, luminance, opacity, etc.). A video conferencing device (see FIG. 1) can include an integrated video capture device that can operate to capture video and provide frames of pixel data.

The pre-processor 202 can operate to process the captured pixel data to provide a pre-processed signal 206 to an encoder 208, but is not so limited. As described below, a perceptual residue selector 207 may further process the captured pixel data to reduce the amount of pixel data passed on to encoder 208. Additionally, bandwidth constraints can be compensated for since less pixel data may be transmitted with each encoded field. In one embodiment, the functionality of pre-processor 202 and perceptual residue selector 207 may be included with the encoder 208 or some other component(s) (e.g., part of the signal capture device, etc.). Pre-processor 202 may comprise a motion compensation sub-component operable to align subsequently captured frames of pixel data. Consistent with exemplary embodiments, the motion compensation sub-component may compensate for movement of a source of the captured video frames. Further consistent with exemplary embodiments, corresponding pixels in a first video frame and a subsequent video frame may be located at the same coordinates in each video frame. For example, corresponding pixels may comprise a pixel 4 pixels across and 3 pixels down from a top left corner of each video frame.

As described below, perceptual residue selector 207 may be configured to discard certain pixel data while retaining other pixel data associated with a given frame of pixel data to thereby reduce a number of processing operations of the encoder 208 when processing the pre-processed signal 206. In an embodiment, perceptual residue selector 207 may operate to discard pixels associated with a subsequent frame of pixel data that may not result in any visually detectable difference when compared with corresponding pixels in a previous frame of pixel data. Perceptual residue selector 207 may determine a sensitivity threshold for the subsequent frame of pixel data and may similarly discard pixels in a second subsequent frame of pixel data.

Consistent with exemplary embodiments, determining whether the luminescence difference in two corresponding pixels may comprise comparing the luminescence difference to a contrast sensitivity threshold. The contrast sensitivity threshold may comprise a measure of the smallest contrast, or Just Noticeable Difference (JND), that may yield a visible signal over a uniform background. The contrast sensitivity threshold may be determined according to display characteristics of a display device. For example, the contrast sensitivity threshold may be determined according to a luminescence of the pixel with respect to at least one of a screen resolution, a viewing distance, a minimum display luminescence ($L_{min}$), and a maximum display luminescence ($L_{max}$). A typical Liquid Crystal Display (LCD) device may comprise a minimum display luminescence of 0 cd/m² and a maximum display luminescence of 175 cd/m². Further consistent with exemplary embodiments, a mean contrast sensitivity threshold may be determined for a plurality of pixels. For example, the contrast sensitivity threshold of an 8×8 block of pixels may be determined according to a mean luminescence computing a sum of a luminescence for each pixel in the 8×8 block and dividing by 64—the number of pixels in the 8×8 block.

Perceptual residue selector 207 may be operable to compare a luminescence of each pixel in a corresponding 8×8 block of pixels in a subsequent video frame to the mean luminescence of the 8×8 block of pixels in a previously received video frame. The difference in luminescence (the residue value) may then be compared to the mean sensitivity threshold to determine whether the data for a given pixel in the subsequent video frame may be set to zero. Consistent with exemplary embodiments, at least one MMX instruction may be operable to perform a comparison on 8 blocks at a time to improve the efficiency of perceptual residue selector 207.

Mean sensitivity thresholds for a plurality of mean luminescence values may be calculated according to characteristics of a display device. For example, a mean sensitivity threshold may be stored in a lookup table according to the mean luminescence value so that the mean sensitivity threshold need not be recalculated for each pixel and/or plurality of pixels. The mean sensitivity threshold may be determined according to a formula:

$$T = \frac{tM_g}{L\max - L\min}.$$

In the above formula, wherein T is the mean sensitivity threshold, $M_g$ may comprise a total number of luminescence levels (e.g. 255), $L_{max}$ may comprise a maximum luminescence of a display device, and $L_{min}$ may comprise a minimum luminescence of the display device. The value of t may comprise a contrast threshold determined according to a hyperbolic model based on the mean luminescence of the pixel and/or plurality of pixels, which may vary from zero to the total number of luminescence thresholds (e.g. 255 for an 8-bit pixel representation).

The Luminance-dependant hyperbolic model may be computed according to the following:

$$t = \min(10^{g_{0,1}}, 10^{g_{1,0}});$$

$$g_{0,1} = \log_{10} T_{min} + K\left(\log_{10} \frac{1}{2N_{blk} w_y} - \log_{10} f_{min}\right)^2; \text{ and}$$

$$g_{1,0} = \log_{10} T_{min} + K\left(\log_{10} \frac{1}{2N_{blk} w_x} - \log_{10} f_{min}\right)^2.$$

The values $w_x$ and $w_y$ may comprise the horizontal width and vertical height of a pixel in degrees, respectively. $N_{blk}$ may comprise the number of pixels in a given block. Luminance dependant parameters may be computed as:

$$T_{min} = \begin{cases} \left(\frac{L}{L_T}\right)^{\alpha_T} \frac{L_T}{S_0}, & L \leq L_T \\ \frac{L}{S_0}, & L > L_T; \end{cases}$$

$$f_{min} = \begin{cases} f_0\left(\frac{L}{L_f}\right)^{\alpha_f}, & L \leq L_f \\ f_0, & L > L_f; \end{cases}$$

$$K = \begin{cases} K_0\left(\frac{L}{L_K}\right)^{\alpha_K}, & L \leq L_K \\ K_0, & L > L_K; \end{cases}$$

The values of the constants may comprise: $L_T$=13.45 cd/m², $S_0$=94.7, $\alpha_T$=0.649, $\alpha_f$=0.182, $f_0$=6.78 cycles/deg, $L_f$=300 cd/m2, $K_0$=3.125, $\alpha_K$=0.0706, $M_g$=255, and $L_K$=300 cd/m². The local background luminance (L) may be computed as:

$$L = L_{min} + B_M \frac{L_{max} - L_{min}}{M_g}.$$

$B_N$ may comprise a mean of the 8×8 block (the mean is calculated by summing all the pixels in the block and dividing by the total number of pixels in the block). The mean may comprise any integer value between 0 and 255 for an 8 bit pixel representation. Thus 'L' and 't' for each mean $B_N$ may be computed offline and the threshold 'T' for each mean may be stored in a look-up table.

In encoder 208, encoding may be performed block by block, wherein the mean of the block to be encoded may be computed and the threshold may be retrieved from the lookup table. The residues may then be computed for the 8×8 block and each residue may be compared to the threshold T. If the residue is greater than threshold T, no change may be made to the pixel; if the residue is below threshold T, the pixel's value may be set to zero.

After pre-processing and perceptual residue selection operations, pre-processed signal 206 may be communicated to the encoder 208 and/or other component(s) for further processing. The encoder 208 may operate to encode the pre-processed signal 206 according to a desired encoding technique (e.g., VC-1, H261, H264, MPEG et al., etc.). Consistent with exemplary embodiments, encoding the encoder may disregard pixels set to a value of zero by perceptual residue selector 207 so that no data need be included in the encoded signal for that pixel. The encoded signal 210 may be communicated over a communication medium, such as a communication channel of a communication network 212 to one or more conferencing participants. At the receiving side, a decoder 214 may operate to decode the received signal 216 that has been previously encoded by the encoder 208, but is not so limited. The decoder 214 may use decoding operations to decode the received signal 216 in accordance with the type of encoding operations performed by the encoder 208. Further consistent with exemplary embodiments, the decoder may receive a first video frame and a subsequent video frame, wherein at least one of the pixels of the subsequent video frame has a zero value. The decoder may treat the zero value pixel in the subsequent video frame as not having changed from the first video frame and so may re-use the value of the corresponding pixel in the first video frame as the value of the pixel in the subsequent video frame. As shown in FIG. 2, the decoder 214 outputs a decoded signal 218 that may be input to a post-processor 220. In one embodiment, the functionality of the post-processor 220 can be included with the decoder 214 or some other component(s).

The post-processor 220 can operate to process the decoded signal 218 to provide a post-processed signal 222. The post-processed signal 222 can be stored in some dedicated storage or provided to a display device for display to one or more conference participants. As described below, the post-processor 220 can be configured to reconstruct a captured frame of pixel data by using fields of pixel data to determine pixel values for the reconstructed frame. In an embodiment, the post-processor 220 can operate to process consecutive or other associated fields of pixel data to reconstruct a frame of pixel data.

In one embodiment, the post-processor 220 can use a first group of pixels associated with a first field of pixel data and a second group of pixels associated with a second field of pixel data to reconstruct pixel data associated with a captured frame of pixel data. For example, the post-processor 220 can operate to process consecutive fields (e.g., odd and even fields) of pixel data to reconstruct a frame of pixel data which can be displayed on an associated display. As an example of the functionality of the post-processor 220, assume that a first field of pixel data includes all of the even rows of pixels of an associated frame. That is, the first field does not include pixel data for the odd rows of pixels (e.g., all pixel values in an odd row have been previously discarded or set to zero).

While a certain number of components are shown in FIG. 2, a participant device can include pre-processing, post-processing, encoding, decoding, and/or other components and/or functionality to enable participation in a video conference or other video experience.

Figure 3:
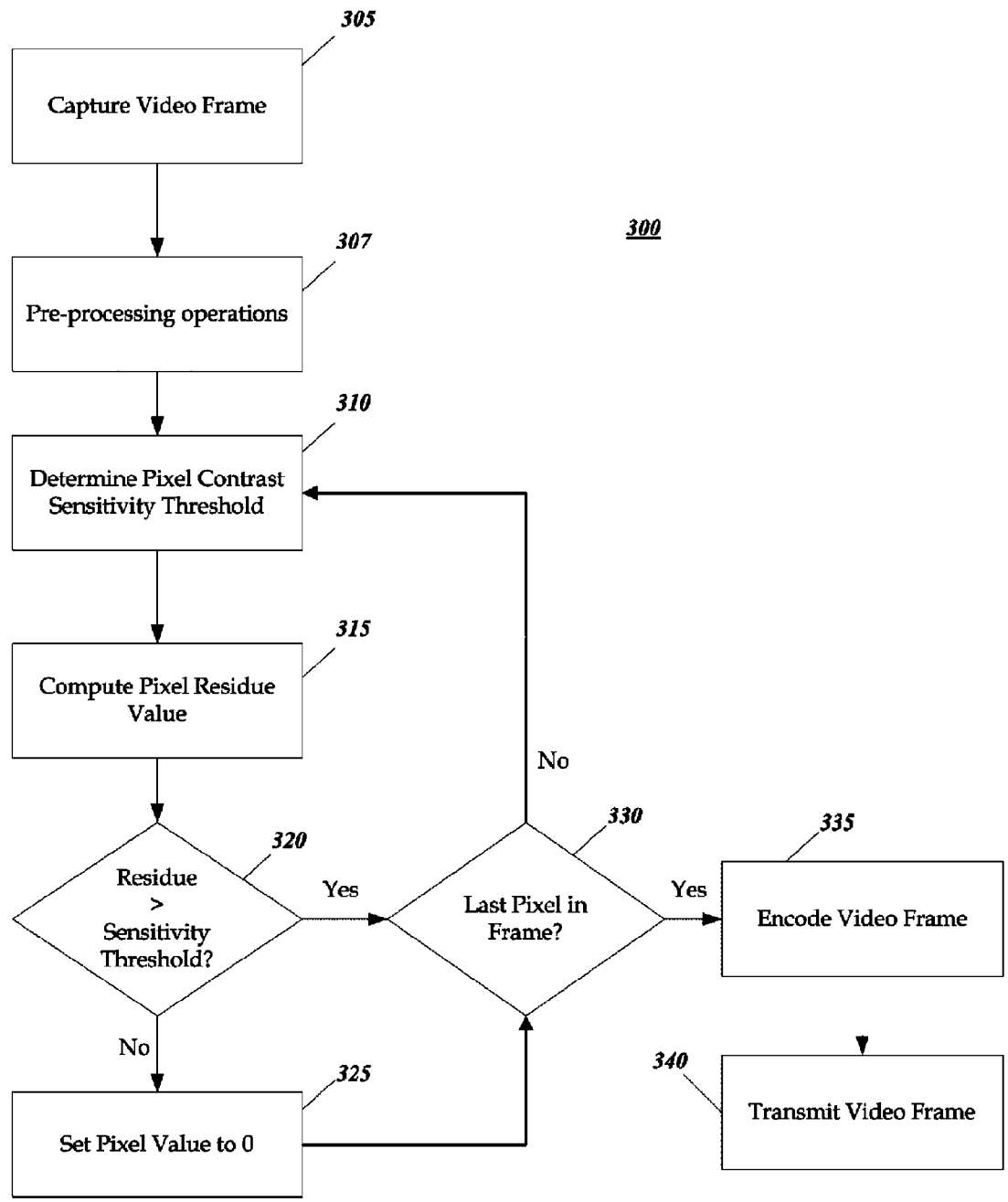
FIG. 3 is a flow chart of a method for providing a perceptual mechanism for the selection of residues in a video signal processor.

FIG. 3 is a flow chart setting forth the general stages involved in a method 300 consistent with an embodiment of the invention for providing a perceptual mechanism for the selection of residues in video coders. Method 300 may be implemented using a computing device 400 as described in more detail below with respect to FIG. 4. Ways to implement the stages of method 300 will be described in greater detail below. Method 300 may begin at stage 305 where computing device 400 may capture a video frame from a video capture source such as camera 106. Computing device 400 may receive a sequence of video frames, wherein computing device 400 is operable to maintain the sequence of video frames in order of receipt. Each received video frame may comprise a plurality of pixels. For example, each received video frame may comprise a size of 640×480 pixels.

From stage 305, where computing device 400 received at least one first video frame and at least one second video frame, method 300 may advance to stage 307 where computing device 400 may perform a series of pre-processing operations on each received video frame. For example, computing device 400 may perform motion compensation to align the pixels of the second video frame with corresponding pixels in the first video frame.

From stage 307, where computing device 400 may perform pre-processing operations, method 300 may advance to stage 310 where computing device 400 may determine a contrast sensitivity threshold, as described above, for at least one pixel in the received video frame. Consistent with exemplary embodiments, computing device 400 may determine a mean contrast sensitivity threshold for a plurality of pixels. For example, computing device 400 may determine a mean contrast sensitivity threshold for an 8×8 block of pixels within the received video frame.

Determining the mean sensitivity threshold for a block of pixels may comprise determining a mean luminescence for the block of pixels by computing a sum of the luminescence for each pixel in the block and dividing by the number of pixels in the block. Consistent with exemplary embodiments, each pixel may have a luminescence value ranging from 0 to 255.

From stage 310, method 300 may advance to stage 315 where computing device 400 may compute a residue value for each pixel in a subsequent received video frame. The residue value may be determined by a perceptual mechanism component within computing device 400 and may comprise a difference in luminescence between a pixel in the subsequently received video frame and a pixel in a previously received video frame for which a contrast sensitivity has been determined. Consistent with exemplary embodiments the residue value of the pixel in the subsequently received video frame may be determined according to a mean luminescence determined for a plurality of pixels in the previously received video frame. For example, a pixel in the subsequently received video frame may comprise a luminescence of 200 $cd/m^2$ and a corresponding pixel in the previously received video frame may be associated with an 8×8 block of pixels comprising a mean luminescence of 198 $cd/m^2$ resulting in a residue value comprising 2 $cd/m^2$. Further consistent with exemplary embodiments, a mean residue value may be computed for a block of pixels in the subsequently received video frame according to the mean luminescence of a corresponding block of pixels in the previously received video frame.

Once computing device 400 determines the pixel residue value in stage 315, method 300 may continue to stage 320 where computing device 400 may determine whether the residue value exceeds the sensitivity threshold. For example, a residue value of 2 $cd/m^2$ may be less than a sensitivity threshold of 5 $cd/m^2$.

In response to determining that the residue value is less than the sensitivity threshold at stage 320, computing device 400 may advance to stage 325 where computing device 400 may set the display value of the pixel to zero. If the residue value exceeds the sensitivity threshold, computing device 400 may not modify the pixel's value at stage 320.

Method 300 may then advance to stage 330, where computing device may determine whether each pixel in the subsequently received video frame has been processed to compute the residue value and compared to the sensitivity threshold of the corresponding pixel in the previously received video frame. If at least one next pixel in the subsequently received video frame has not been processed, method 300 may return to stage 310 where computing device 400 may proceed with comparing the at least one next pixel to the corresponding next pixel in the previously received video frame. Consistent with exemplary embodiments, computing device 400 may determine a sensitivity threshold for each pixel in the previously received video frame prior to beginning to process the subsequently received video frame. For example, computing device 400 may determine a sensitivity threshold for each 8×8 block of pixels in a first video frame comprising 640×480 pixels at stage 310. Computing device 400 may then determine a residue value for each 8×8 block of pixels in a second video frame corresponding to each 8×8 block of pixels in the first video frame. Computing device 400 may then determine whether the residue value of each 8×8 block of pixels in the second video frame is greater than the sensitivity threshold of the corresponding 8×8 block of pixels in the first video frame. Further consistent with exemplary embodiments, computing device 400 may determine a residue value for each 8×8 block in the second video frame prior to comparing the residue values of the 8×8 blocks of pixels to the sensitivity thresholds of the corresponding 8×8 blocks of pixels in the first video frame.

After computing device 400 determines at stage 330 that all of the pixels in the subsequently received video frame have had their residue values determined and compared to the contrast sensitivity threshold of the previously received video frame, computing device 400 may advance to stage 335 where computing device 400 may encode the subsequently received video frame for transmission on a communication channel. Consistent with exemplary embodiments, encoding the video frame may comprise encoding the video frame according to, for example, at least one of the following formats: MPEG2, H.264, and VC-1.

Computing device 400 may then advance to stage 340 where computing device may transmit the encoded video frame on a communication channel. For example, computing device may send the video frame to a receiving computing device via a network connection. The receiving computing device may comprise a decoder operable to process the received signal and provide a decoded signal for display on a display device.

An embodiment consistent with the invention may comprise a system for providing a video signal. The system may comprise a memory storage and a processing unit coupled to the memory storage. The processing unit may be operative to receive a first and second video frame wherein each video frame comprises a plurality of pixels, determine a sensitivity threshold for at least one of the pixels in the first video frame, determine whether a difference in a luminescence of the at least one pixel in the first video frame and a luminescence of at least one corresponding pixel in the second video frame (a residue value) is greater than the determined sensitivity threshold, and, if the residue value is less than the sensitivity threshold, set the value of the corresponding pixel in the second video frame to zero.

Another embodiment consistent with the invention may comprise a system for providing a video signal. The system may comprise a memory storage and a processing unit coupled to the memory storage. The processing unit may be operative to receive a plurality of video frames, wherein each video frame comprises a plurality of pixels, determine a residue value for at least one of the plurality of pixels in at least one subsequently received frame compared to at least one of the plurality of pixels in at least one previously received frame, wherein the residue value comprises a difference in a luminescence of the at least one of the plurality of pixels in the at least one subsequently received frame and the luminescence of the at least one of the plurality of pixels in the at least one previously received frame, and determine whether the residue value exceeds a sensitivity threshold for the at least one of the plurality of pixels in the at least one previously received frame, wherein the sensitivity threshold comprises a measure of minimum contrast operable to produce a visually noticeable difference between the at least one of the plurality of pixels in the at least one previously received frame and the at least one of the plurality of pixels in the at least one subsequently received frame. In response to determining that the residue value does not exceed a sensitivity threshold value, the system may be operable to set the value of the at least one of the plurality of pixels in the at least one subsequently received frame to zero and encode the plurality of video frames for transmission on a communication channel.

Yet another embodiment consistent with the invention may comprise a video conferencing device. The device may comprise a memory storage and a processing unit coupled to the memory storage. The device may comprise a video capture component operable to capture at least one video frame comprising a plurality of pixels, a video processor component comprising a motion compensation sub-component operable to align at least two subsequent video frames, and a perceptual residue selection component. The perceptual residue selection component may be operable to compare the at least one captured video frame to at least one previously captured video frame, determine a sensitivity threshold for at least one pixels in the at least one previously captured video frame, wherein determining the sensitivity threshold for the at least one pixel comprises determining a least amount of contrast to the at least one pixel sufficient to produce a visually detectable difference to a human viewer and wherein determining the least amount of contrast comprises computing a minimum luminescence difference between the at least one pixel and at least one pixel of at least one subsequently captured video frame sufficient to produce a visually detectable difference according to at least one characteristic of a display device, determine whether a difference in a luminescence of the at least one pixel in the at least one previously captured video frame and the at least one pixel in the at least one subsequently captured video frame is less than the determined sensitivity threshold, and in response to determining that the difference in the luminescence of the at least one pixel in the at least one previously captured video frame and the at least one pixel in the at least one subsequently captured video frame is less than the determined sensitivity threshold, set a value of the at least one of the plurality of pixels in the at least one subsequently captured video frame to zero. The device may further comprise an encoding component operable to encode the captured video frame for transmission on a communication channel configured such that a pixel value of zero does not require any data to be encoded for transmission and a transmission component operable to transmit the encoded video frame on the communication channel.

Figure 4:
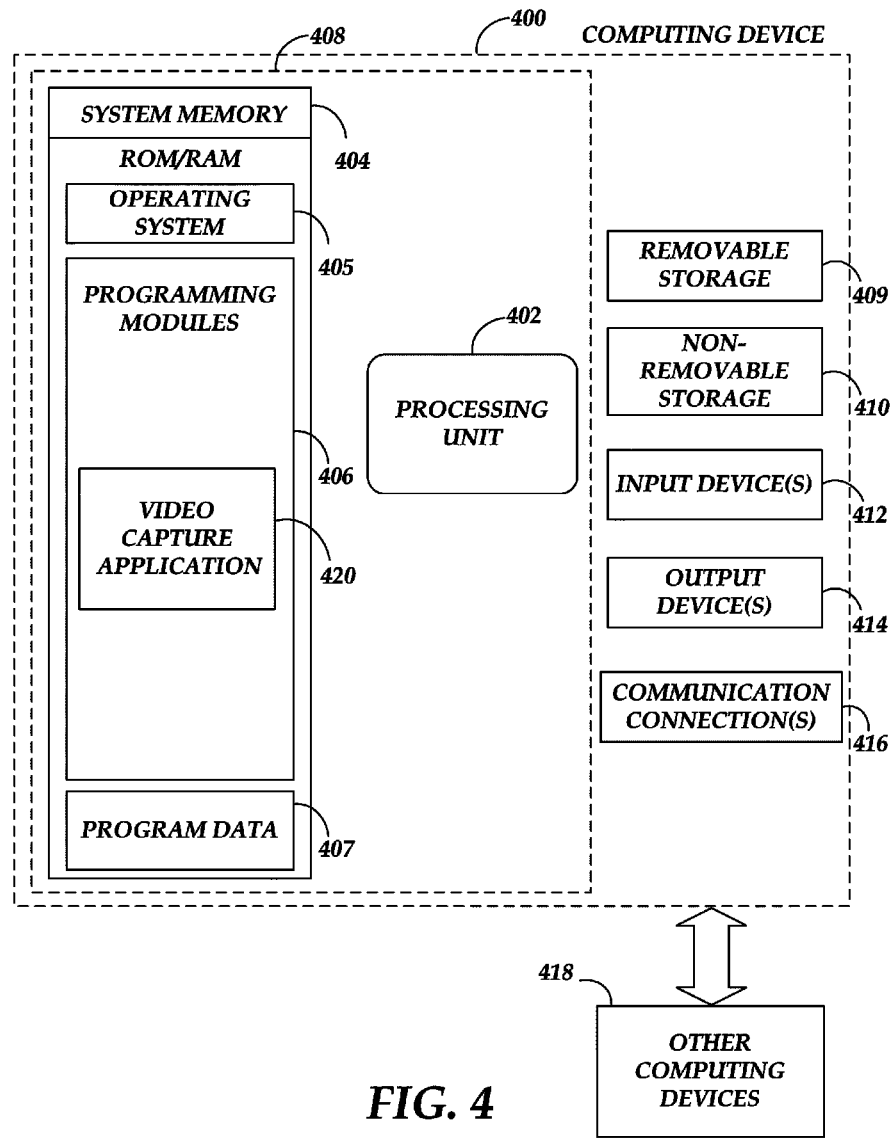
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include a video capture application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. video capture application 420) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method of providing a video signal comprising:
   receiving a first video frame comprising a plurality of pixels;
   receiving a second video frame comprising a plurality of pixels;
   determining a difference in a luminescence of a pixel in the first video frame and a luminescence of a pixel in the second video frame corresponding to the pixel in the first video frame, and comparing the determined difference with a predetermined sensitivity threshold; and
   setting a pixel value of the pixel in the second video frame to zero when the determined difference in the luminescence of the pixel in the first video frame and the luminescence of the pixel in the second video frame is not greater than the predetermined sensitivity threshold.

2. The method of claim 1, wherein the predetermined sensitivity threshold is determined based on a mean sensitivity threshold for at least one 8×8 block of the plurality of pixels in the first video frame.

3. The method of claim 2, wherein determining the mean sensitivity threshold for the at least one 8×8 block of the plurality of pixels in the first video frame further comprises determining a mean luminescence for the at least one 8×8 block of the plurality of pixels, wherein determining the mean luminescence for the at least one 8×8 block of the plurality of pixels comprises:
   computing a sum of a luminescence of each pixel in the at least one 8×8 block of the plurality of pixels in the first video frame; and
   dividing the sum by the number of pixels in the at least one 8×8 block of the plurality of pixels in the first video frame.

4. The method of claim 1, further comprising encoding the first video frame and the second video frame for transmission on a network, wherein encoding a pixel value of zero does not require any data to be sent on the network.

5. The method of claim 1, wherein a position of the pixel in the second video frame is the same as a position of the pixel in the first video frame.

6. The method of claim 1, further comprising aligning the image of the first video frame and the second video frame to compensate for motion of a source for the first video frame and the second video frame prior to determining the difference in the luminescence of the pixel in the first video frame and the luminescence of the pixel in the second video frame.

7. The method of claim 4, further comprising:
   receiving the encoded first video frame;
   receiving the encoded second video frame; and
   decoding the encoded first video frame and the encoded second video frame, wherein decoding the pixel set to zero in the second video frame comprises re-using a value of a pixel in the first video frame.

8. The method of claim 3, wherein determining the mean sensitivity threshold for the at least one 8×8 block of the plurality of pixels in the first video frame further comprises, comparing the mean luminescence of the at least one 8×8 block of the plurality of pixels in the first video frame to a pre-computed lookup table comprising a plurality of mean sensitivity thresholds indexed to a plurality of mean luminescence values.

9. The method of claim 1, wherein the predetermined sensitivity threshold is determined according to at least one of the following: screen resolution of a display device, a viewing distance between the display device and a user, a minimum luminance of the display device, and a maximum luminance of the display device.

10. The method of claim 3, wherein determining the mean sensitivity threshold for the at least one 8×8 block of the plurality of pixels in the first video frame further comprises determining the mean sensitivity threshold according to a formula $T=(t^*M_g)/(L_{max}-L_{min})$, wherein:
    T comprises the mean sensitivity threshold,
    t comprises a contrast threshold determined according to a hyperbolic model based on the mean luminescence of the at least one 8×8 block of the plurality of pixels,
    $M_g$ comprises a total number of luminescence levels,
    $L_{max}$ comprises a maximum luminance of a display device, and
    $L_{min}$ comprises a minimum luminance of the display device.

11. The method of claim 10, wherein the display device comprises a Liquid Crystal Display comprising a maximum luminance of 175 $cd/m^2$ and a minimum luminance of 0 $cd/m^2$.

12. The method of claim 1, further comprising executing at least one graphics processor instruction on a computing device to determine a difference in the luminescence of multiple pixels in the first video frame and the luminescence of multiple associated pixels in the second video frame simultaneously.

13. A system to provide a video signal, the system comprising a processor, a memory storage coupled to the processor, and communication components coupled to the processor and the memory storage operable to:
    receive a plurality of video frames, wherein each video frame comprises a plurality of pixels;
    determine a difference of a residue value for a pixel in at least one subsequently received frame and a pixel in at least one previously received frame and comparing the difference with a predetermined sensitivity threshold, wherein the residue value comprises a difference in a luminescence of the pixel in the at least one subsequently received frame and the luminescence of the pixel in the at least one previously received frame, the predetermined sensitivity threshold comprises a measure of minimum contrast operable to produce a visually noticeable difference between the pixel in the at least one previously received frame and the pixel in the at least one subsequently received frame;

set a value for the pixel in the at least one subsequently received frame to zero when the residue value does not exceed a value of the predetermined sensitivity threshold; and encode the plurality of video frames for transmission on a communication channel.

14. The system of claim 13, further comprising:
a video source operable to generate the plurality of video frames; and
a pre-processor component operable to align the at least one subsequently received frame with the at least one previously received frame to compensate for a movement of the video source prior to determining the difference of the residue value.

15. The system of claim 13, wherein being operable to encode the plurality of video frames for transmission on the communication channel comprises being operable to encode the plurality of video frames according to at least one of the following: MPEG, MPEG2, H.261, H.264, and VC-1.

16. The system of claim 13, further comprising a decoder operable to process the encoded signal received over the communication channel to provide a decoded signal for display on a display device.

17. The system of claim 16, wherein the predetermined sensitivity threshold is determined according to at least one characteristic of the display device.

18. The system of claim 13, wherein the predetermined sensitivity threshold is determined for a subset of the plurality of pixels of the previously received video frame according to a mean luminescence of the subset of the plurality of pixels of the previously received video frame.

19. The system of claim 16, wherein the pixel in the at least one subsequently received frame set to zero does not require any data to be encoded for transmission on the communication channel.

20. A computer readable storage device including executable instructions which, when executed by a processor, for selection of residues in video coders, by:

receiving a first video frame comprising a plurality of pixels;

receiving a second video frame comprising a plurality of pixels;

determining a difference in a luminescence of a pixel in the first video frame and a luminescence of a pixel in the second video frame and comparing the determined difference with a predetermined sensitivity threshold; and setting a value for the pixel in the second video frame to zero when the determined difference in the luminescence of the pixel in the first video frame and the luminescence of the pixel in the second video frame is not greater than the predetermined sensitivity threshold.

\* \* \* \* \*